United States Patent
Nageshkar et al.

(10) Patent No.: US 10,556,533 B2
(45) Date of Patent: Feb. 11, 2020

(54) VEHICLE SEATBACK SUPPORT ELEMENT TO RESIST PIVOTING MOVEMENT OF SEATBACK WHEN FORCE IS APPLIED TO THE SEATBACK

(71) Applicant: Ford Global Technologies, LLC, Dearborn, MI (US)

(72) Inventors: Vishal Vinayak Nageshkar, Farmington Hills, MI (US); John W. Jaranson, Dearborn, MI (US); Sangram Laxman Tamhankar, Dearborn, MI (US); Mike James Whitens, Novi, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/969,333

(22) Filed: May 2, 2018

(65) Prior Publication Data

US 2019/0337435 A1  Nov. 7, 2019

(51) Int. Cl.
*B60N 2/90* (2018.01)
*B60N 2/20* (2006.01)
*B60N 2/30* (2006.01)
*B60N 2/06* (2006.01)

(52) U.S. Cl.
CPC .............. *B60N 2/919* (2018.02); *B60N 2/06* (2013.01); *B60N 2/20* (2013.01); *B60N 2/3011* (2013.01)

(58) Field of Classification Search
CPC . B60N 2/919; B60N 2/06; B60N 2/20; B60N 2/22; B60N 2/42; B60N 2/3011
See application file for complete search history.

(56) References Cited

U.S. PATENT DOCUMENTS

| | | | | |
|---|---|---|---|---|
| 2,829,702 A | * | 4/1958 | Keating | B60N 2/4242 297/183.9 |
| 3,620,568 A | * | 11/1971 | Morrow | A47C 1/02 297/307 |
| 3,826,434 A | * | 7/1974 | Von Beckh | B64D 11/0689 244/122 R |
| 3,986,748 A | * | 10/1976 | Magnuson | B60N 2/501 296/65.02 |
| 4,257,626 A | * | 3/1981 | Adomeit | B60N 2/4221 280/805 |

(Continued)

*Primary Examiner* — Philip F Gabler
(74) *Attorney, Agent, or Firm* — Vichit Chea; Price Heneveld LLP

(57) ABSTRACT

A vehicle comprises a seating assembly including a seatback pivotally movable relative to a seat about an axis, the seatback including a bottom portion and a top portion disposed further away from the axis than the bottom portion; and a seatback support element having a first portion coupled to the vehicle at a position other than the seatback and a second portion where the seatback interacts with the seatback support element, the seatback support element resisting pivotal movement of the seatback about the axis. The seatback support element can further includ3 a third portion coupled to the vehicle at a position other than the seatback. The second portion is between the first portion and the third portion along a length of the seatback support element. The first portion is coupled to the vehicle forward of the axis of the seatback and the third portion is coupled rearward of the axis.

20 Claims, 9 Drawing Sheets

(56) References Cited

U.S. PATENT DOCUMENTS

| | | | | |
|---|---|---|---|---|
| 5,176,402 A * | 1/1993 | Coulon | ................... | B60R 22/24 |
| | | | | 280/807 |
| 6,481,777 B2 * | 11/2002 | Mans | ................... | B60N 2/4214 |
| | | | | 296/65.01 |
| 7,293,818 B2 * | 11/2007 | Kumpf | ................... | B60N 2/015 |
| | | | | 296/68.1 |
| 7,744,155 B2 * | 6/2010 | List | ................... | B60N 2/42736 |
| | | | | 297/216.17 |
| 7,758,095 B2 * | 7/2010 | Elhanany | ................. | B60N 2/24 |
| | | | | 296/63 |
| 8,317,262 B2 * | 11/2012 | Schroth | ................. | B60N 2/005 |
| | | | | 297/216.1 |
| 8,382,181 B2 * | 2/2013 | Bourgraf | ................ | B60N 2/995 |
| | | | | 296/19 |
| 8,919,882 B2 * | 12/2014 | Greenwood | ........... | B60N 3/063 |
| | | | | 297/311 |
| 9,033,412 B2 * | 5/2015 | Reinck | .................... | B60N 2/24 |
| | | | | 244/122 R |
| 9,285,193 B2 * | 3/2016 | Carlsson | ................. | B60N 2/24 |
| 2013/0152775 A1 * | 6/2013 | Jessup | ..................... | B60N 2/24 |
| | | | | 89/36.08 |
| 2017/0043688 A1 * | 2/2017 | Gallagher | ................ | B60N 2/14 |

* cited by examiner

VEHICLE SEATBACK SUPPORT ELEMENT TO RESIST PIVOTING MOVEMENT OF SEATBACK WHEN FORCE IS APPLIED TO THE SEATBACK

FIELD OF THE INVENTION

The present invention generally relates to the interior of a vehicle, including a seating assembly and resisting the forward or rearward pivoting movement of a seatback of the seating assembly.

BACKGROUND OF THE INVENTION

A vehicle sometimes includes a seating assembly for an occupant to sit upon while occupying the vehicle. The seating assembly sometimes includes a seatback. The load upon the seatback is concentrated at a single pivot axis. A complicated and heavy recline lock mechanism is typically required to accept and distribute the load.

SUMMARY OF THE INVENTION

According to one aspect of the present invention, a vehicle comprises: a seating assembly including a seatback pivotally movable relative to a seat about an axis, the seatback including a bottom portion and a top portion disposed further away from the axis than the bottom portion; and a seatback support element having a first portion coupled to the vehicle at a position other than the seatback and a second portion where the seatback interacts with the seatback support element, the seatback support element resisting pivotal movement of the seatback about the axis.

Embodiments of the first aspect of the invention can include any one or a combination of the following features:
  the seatback support element further including a third portion coupled to the vehicle at a position other than the seatback;
  the second portion is between the first portion and the third portion along the seatback support element;
  the first portion is coupled to the vehicle at a position forward of the axis of the seatback and the third portion is coupled to the vehicle at a position rearward of the axis of the seatback;
  a track upon which the seating assembly selectively moves forward or rearward, and either the first portion, the third portion, or both the first portion and the third portion are coupled to the track;
  at least one of the first portion and the third portion is coupled to the vehicle via a roller that applies pre-tension to the seatback support element;
  the seatback has a locked position relative to the seatback support element such that the seatback is locked onto the seatback support element at the second portion of the seatback support element, and an unlocked position relative to the seatback support element such that the seatback can pivot about the axis and the second portion where the seatback interacts with the seatback support element changes to a different location on the seatback support element between the first portion and the third portion;
  the third portion but not the first portion is coupled to the vehicle via a roller that applies pre-tension to the seatback support element, while the first portion is anchored to the vehicle;
  the seatback has a vertical midline, and the first portion is coupled to the vehicle at a position laterally further away from the vertical midline of the seatback than the second portion;
  when a rearward force is applied to the seatback, the seatback support element between the first portion and the second portion resists the seatback pivoting about the axis in the rearward direction;
  when a forward force is applied to the seatback, the seatback support element between the third portion and the second portion resists the seatback pivoting about the axis in the forward direction;
  the seatback is pivotally coupled to the seat about the axis;
  the seatback is decoupled from the seat;
  the vertical midline of the seatback divides the seatback into a first side and a second side;
  a second seatback support element having a first portion coupled to the vehicle at a position other than the seatback, a second portion where the seatback interacts with the second seatback support element, and a third portion coupled to the vehicle at a position other than the seatback, the second seatback support element resisting pivoting of the seatback about the axis;
  the second portion of the second seatback support element is positioned between the first portion and the third portion along the second seatback support element, and the first portion of the second seatback support element is coupled to the vehicle at a position forward of the axis of the seatback and the third portion of the second seatback support element is coupled to the vehicle at a position rearward of the axis of the seatback;
  the second portion of the seatback support element interacts with the seatback at the first side of the vertical midline and the second portion of the second seatback support element interacts with the seatback at the second side of the vertical midline;
  the seating assembly further comprises a head restraint extending from the seatback, the head restraint having a first side and a second side;
  the second portion of the seatback support element is disposed adjacent the first side of the head restraint, and the second portion of the second seatback support element is disposed adjacent the second side of the head restraint;
  the third portion of the seatback support element is coupled to the vehicle at a position laterally closer to the vertical midline of the seatback than the second portion;
  the third portion of the seatback support element is coupled to the track; and
  the first portion of the seatback support element is disposed further away from the vertical midline than the third portion.

According to a second aspect of the present invention, a vehicle comprises: a seating assembly including a seatback pivotally movable relative to a seat about an axis, the seatback including a bottom portion, a top portion disposed further away from the axis than the bottom portion, and a releasable locking mechanism at the top portion; a seatback support element that extends through an opening of the releasable locking mechanism of the seating assembly, the seatback support element having a forward portion coupled to the vehicle at a position forward of the axis of the seatback and a rearward portion coupled to the vehicle at a position rearward of the axis of the seatback; and the seatback having a locked position where the releasable locking mechanism locks onto the seatback support element, and an unlocked position where the releasable locking mechanism does not lock onto the seatback support element and the seatback can pivot about the axis; wherein, when the releasable locking mechanism is in the locked position, and a rearward force is applied to the seatback, the seatback support element resists the seatback pivoting about the axis in the rearward direction; and wherein, when the releasable locking mechanism is in the locked position, and a forward force is applied to the seatback, the seatback support element resists the seatback pivoting about the axis in the forward direction.

Embodiments of the second aspect of the invention can include any one or a combination of the following features:
- a track upon which the seating assembly selectively moves forward or rearward, and the rearward portion is coupled to the track;
- the rearward portion is coupled to the vehicle via a roller that applies pre-tension to the seatback support element;
- the seatback further comprises a vertical midline; and
- the forward portion is coupled to the vehicle at a position laterally further away from the vertical midline of the seatback than where the seatback support element extends through the releasable locking mechanism.

According to a third aspect of the present invention, a vehicle comprises: a seating assembly including a seatback pivotally movable relative to a seat about an axis; the seatback comprising: a bottom portion; a top portion disposed further away from the axis than the bottom portion; a vertical midline separating the seatback into a first side and a second side; a first releasable locking mechanism at the top portion to the first side of the vertical midline; and a second releasable locking mechanism at the top portion to the second side of the vertical midline; a first seatback support element that extends through the first releasable locking mechanism of the seating assembly; a second seatback support element that extends through the second releasable locking mechanism of the seating assembly; the first seatback support element and the second seatback support element each having a forward portion coupled to the vehicle at a position forward of the seatback and a rearward portion coupled to the vehicle at a position rearward of the seatback; and the seatback having a locked position where the first releasable locking mechanism locks onto the first seatback support element and the second releasable locking mechanism locks onto the second seatback support element, and an unlocked position where the first releasable locking mechanism does not lock onto the first seatback support element and the second releasable locking mechanism does not lock onto the second seatback support element, allowing the seatback to pivot about the axis; wherein, when the first releasable locking mechanism and the second releasable locking mechanism are in the locked position, and a rearward force is applied to the seatback, the first seatback support element and the second seatback support element resist rearward pivotal movement of the seatback about the axis; wherein, when the first releasable locking mechanism and the second releasable locking mechanism are in the locked position, and a forward force is applied to the seatback, the first seatback support element and the second seatback support element resist forward pivotal movement of the seatback about the axis; wherein, the forward portion and the rearward portion of first seatback support element, and the first releasable locking mechanism, are all disposed laterally to the first side of the vertical midline of the seatback; and wherein, the forward portion and the rearward portion of second seatback support element, and the second releasable locking mechanism, are all disposed laterally to the second side of the vertical midline of the seatback.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
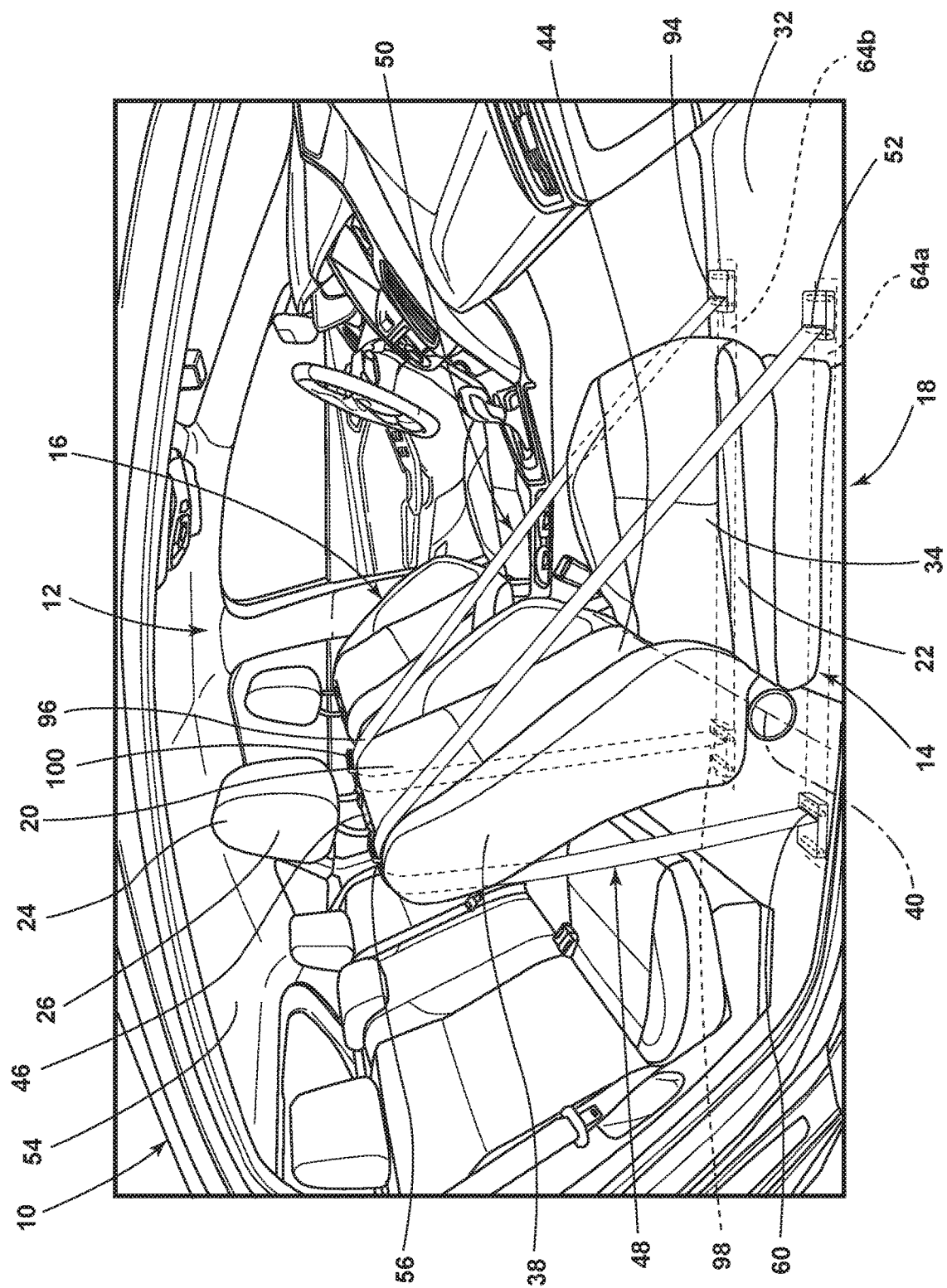
FIG. 1 is a perspective view of an interior of a vehicle, illustrating a seating assembly with a seatback, a seatback support element interacting with a top portion of the seatback at a first side of the seatback, and a second seatback support element interacting with the top portion of the seatback at a second side of the seatback.
Figure 2:
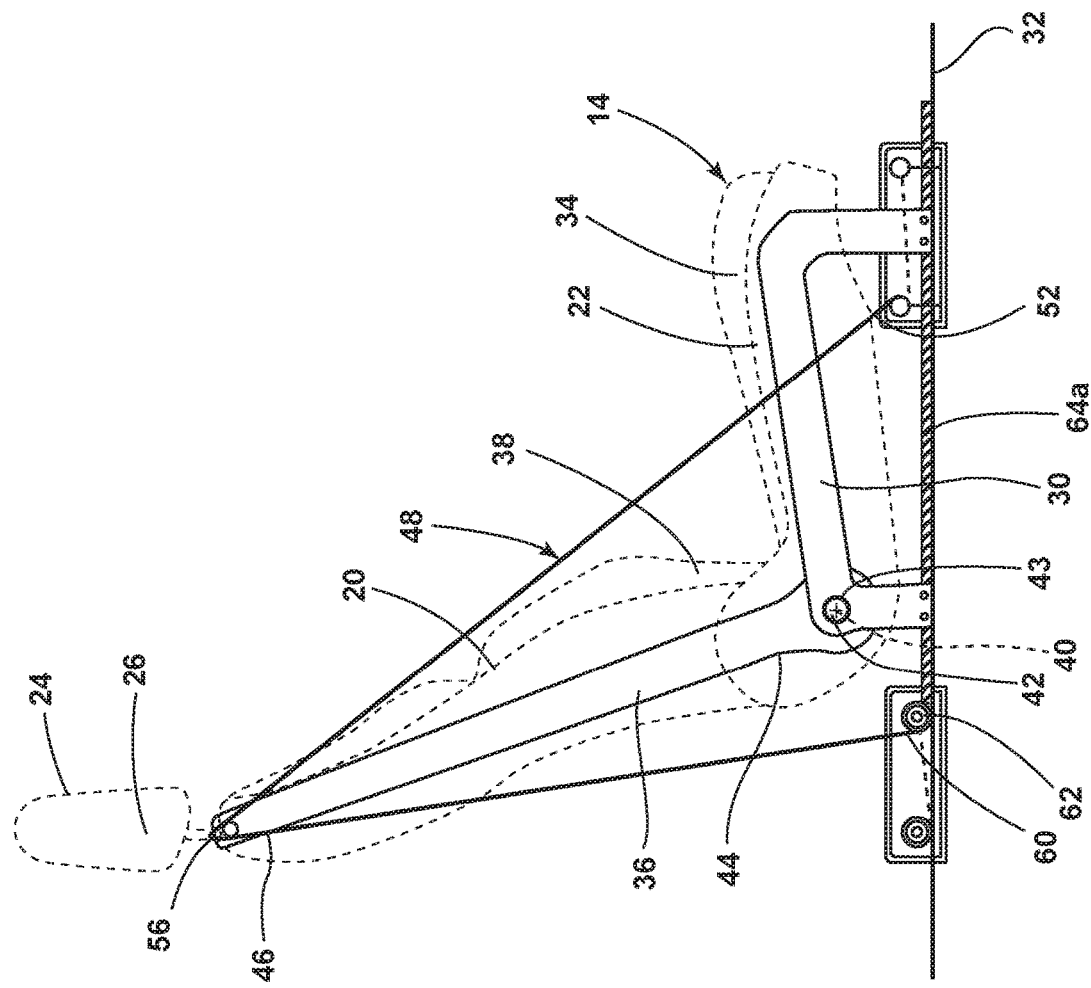
FIG. 2 is a side view of the seating assembly of FIG. 1, illustrating a first portion of the seatback support element anchored to a floor of the vehicle, a third portion of the seatback support element coupled to a roller at the floor, and a second portion disposed between the first portion and the third portion along the seatback support element interacting with the seatback.

For purposes of description herein, the terms "above," "beneath," "forward," "rearward" and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 includes an interior 12 and a seating assembly 14 disposed in the interior 12. The seating assembly 14 may be adjacent to another seating assembly 16, forming a first row of seating 18. The seating assembly 14 can be designated for an occupant of the vehicle 10, such as an operator of the vehicle 10 or a passenger of the vehicle 10. As the seating assembly 14 and the other seating assembly 16 can be identical for purposes of this disclosure, only the seating assembly 14 will be discussed with particularity. The vehicle 10 can be, without limitation, an automobile, a car, a truck, a sports utility vehicle, an operator controlled vehicle, an autonomous vehicle, and the like.

Figure 3:
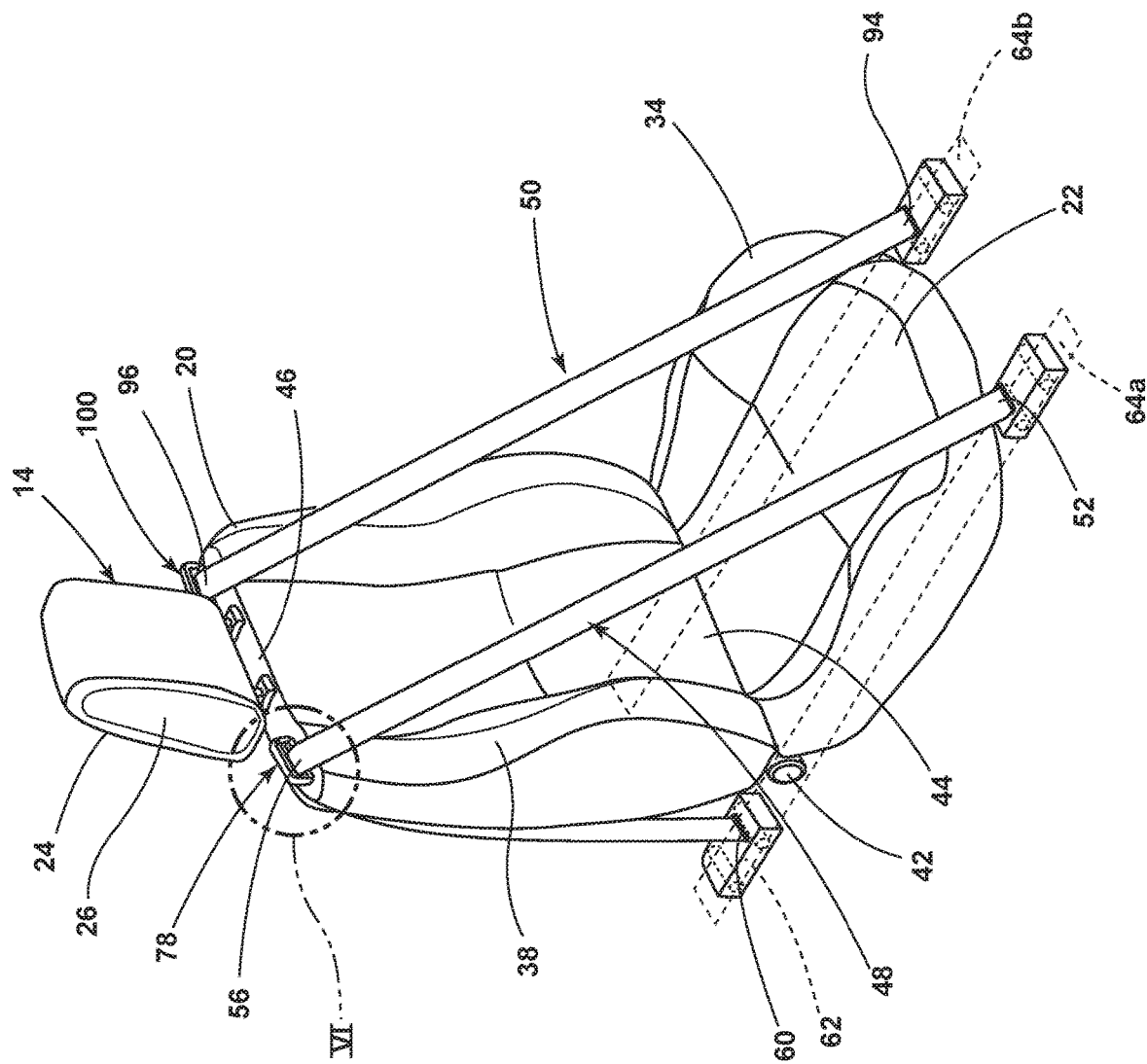
FIG. 3 is a perspective view of the seating assembly of FIG. 1, illustrating the seatback support element extending through a releasable locking mechanism at the second portion of the seatback support element.

Referring now additionally to FIGS. 2-3, the seating assembly 14 includes a seatback 20 and a seat 22. The seating assembly 14 can further include a head restraint 24 (headrest) extending from the seatback 20. The head restraint 24 has a first side 26 and a second side 28 facing the opposite direction as the first side 26. The seat 22 includes a frame 30 elevating the seat 22 above a floor portion 32 of the vehicle 10 and supporting cushioning and trim 34. Likewise, the seatback 20 includes a frame 36 that supports cushioning and trim 38. The seatback 20 can pivot relative to the seat 22 about an axis 40, to allow the seatback 20 to recline or incline. The frame 30 of the seat 22 can be fully disposed beneath the cushioning and trim 34 that the frame 30 supports, or the frame 30 can be partially revealed. Likewise, the frame 36 of the seatback 20 can be fully disposed beneath the cushioning and trim 38 that the frame 36 supports, or the frame 36 can be partially revealed. As in the illustrated embodiment, the seatback 20 can be pivotally coupled to the seat 22 about the axis 40. For example, the frame 36 of the seatback 20 can be attached to or rotate around an axle 42, through which the axis 40 extends, that projects through an aperture 43 of the frame 30 of the seat 22, thus pivotally coupling the seatback 20 to the seat 22. However, in another embodiment (not illustrated), the seatback 20 is decoupled from the seat 22. For example, a riser (not illustrated) could be attached to the floor portion 32 to raise the seatback 20 above the floor portion 32 independent of the seat 22. In any event, the seatback 20 is pivotally movable relative to the seat 22 about the axis 40. An occupant (not illustrated) sits on the seating assembly 14, with the seatback 20 typically supporting the occupant's back and the seat 22 supporting the lower portions of the occupant.

The seatback 20 includes a bottom portion 44 and a top portion 46. The bottom portion 44 is the portion of the seatback 20 nearest the seat 22, and the top portion 46 is the portion of the seatback 20 furthest from the seat 22 and adjacent the head restraint 24. The top portion 46 is thus further away from the axis 40 than the bottom portion 44.

The vehicle 10 further includes a seatback support element 48 interacting with the seatback 20. As explained in greater detail herein, the seatback support element 48 can be utilized to resist pivotal movement of the seatback 20 about the axis 40. The seatback support element 48 can be any length of bendable material that can become taut when a force is applied to the material, such as a strap similar to seatbelt webbing.

The vehicle 10 can further include a second seatback support element 50 also interacting with the seatback 20 to resist pivotal movement of the seatback 20 about the axis 40, while lessening the ability of the seatback 20 to twist due to the interaction of the seatback support element 48. The second seatback support element 50 is functionally identical to the seatback support element 48, and thus the seatback support element 48 will be primarily described herein.

The seatback support element 48 has a first portion 52 that is coupled to the vehicle 10 at a position other than the seatback 20. As in the illustrated embodiment, the first portion 52 could be coupled to the floor portion 32 of the vehicle 10. However, the first portion 52 could be coupled to other structural (frame) components of the vehicle 10, such as a ceiling 54. The first portion 52 could be coupled to the frame 30 of the seat 22, alternatively.

The seatback support element 48 further includes a second portion 56. The second portion 56 is the portion of the seatback support element 48 that interacts with the seatback 20. For example, the second portion 56 can be locked to the top portion 46 of the seatback 20. Assuming that the first portion 52 is forward of the axis 40 of the seatback 20, and the seatback support element 48 between the first portion 52 and the second portion 56 is taut, the seatback support element 48 will resist rearward pivotal movement of the seatback 20 when a rearward force 58 is applied to the seatback 20.

The seatback support element 48 can further include a third portion 60. The third portion 60, like the first portion 52, is coupled to the vehicle 10 at a position other than the seatback 20 and on the other side of the axis 40 as the first portion 52. As in the illustrated embodiment, the third portion 60 could be coupled to the floor portion 32 of the vehicle 10. However, the third portion 60 could be coupled to the ceiling 54 or any other structural component of the vehicle 10 (such as the vehicle 10 frame).

When the seatback support element 48 includes the third portion 60 in addition to the first portion 52, the second portion 56 is between the first portion 52 and the third portion 60 along the seatback support element 48. In other words, the first portion 52 is disposed toward one end of the seatback support element 48 and the third portion 60 is disposed toward another end of the seatback support element 48, with the second portion 56 disposed in between the first portion 52 and the third portion 60 along a length of the seatback support element 48. The first portion 52 is coupled to the vehicle 10 at a position forward of the axis 40 of the seatback 20 (as illustrated in FIG. 2) and is thus the forward portion of the seatback support element 48. The third portion 60 is coupled to the vehicle 10 at a position rearward of the axis 40 of the seatback 20 and is thus the rearward portion of the seatback support element 48.

In the illustrated embodiment, the third portion 60 is coupled to the vehicle 10 via a roller 62. The roller 62 winds the seatback support element 48 until the seatback support element 48 is taut, and thus applies pre-tension to the seatback support element 48. The first portion 52 is coupled to the vehicle 10 via a bolt or some other fastener (not illustrated) to anchor the first portion 52 to the vehicle 10. In other embodiments (not illustrated), the first portion 52 is coupled to the vehicle 10 via a roller (not illustrated), instead of or in addition to the third portion 60.

Figure 4:
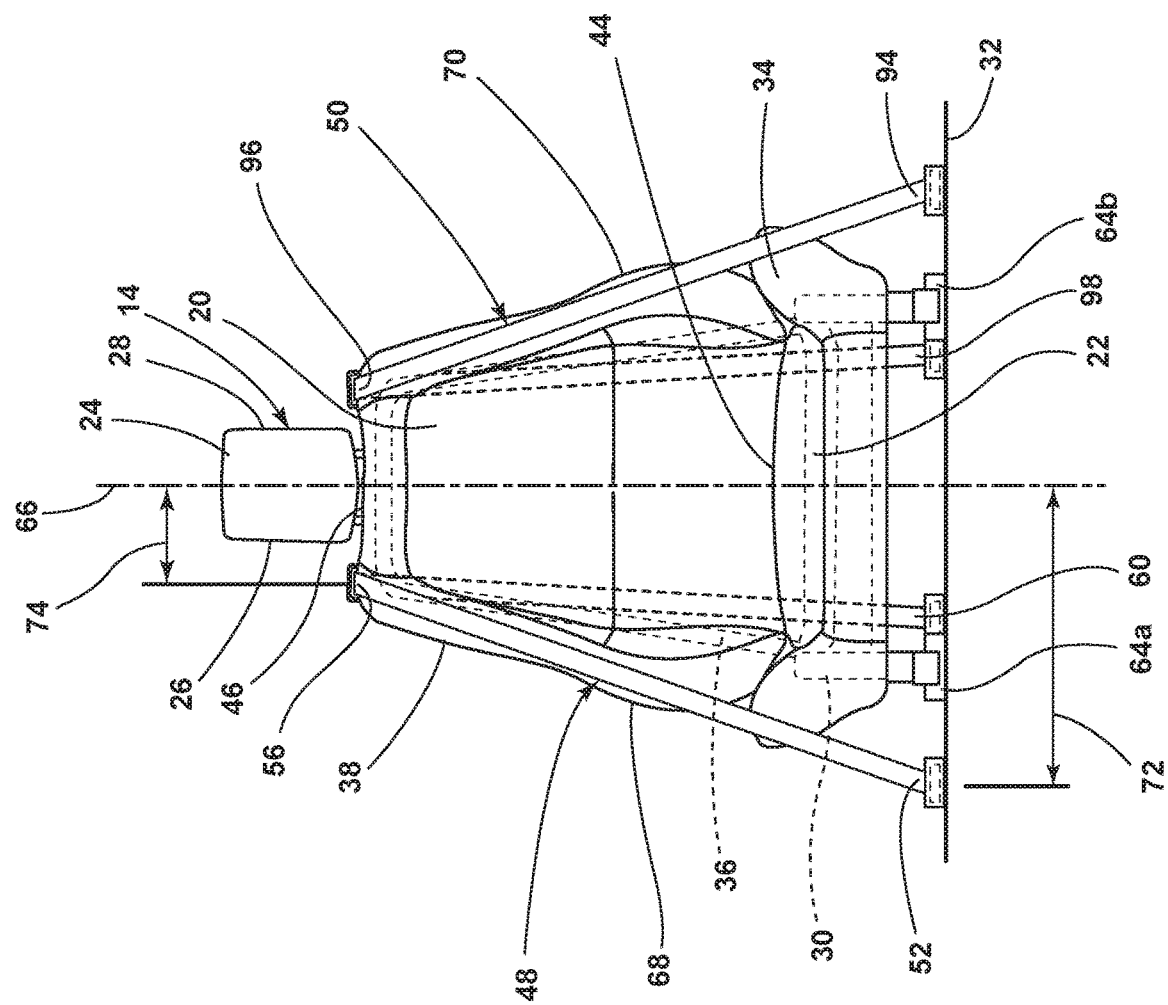
FIG. 4 is a front view of the seating assembly of FIG. 1, illustrating the first portion of the seatback support element disposed laterally a distance from a vertical midline of the seatback that is greater than a distance between the second portion of the seatback support element and the midline.
Figure 5:
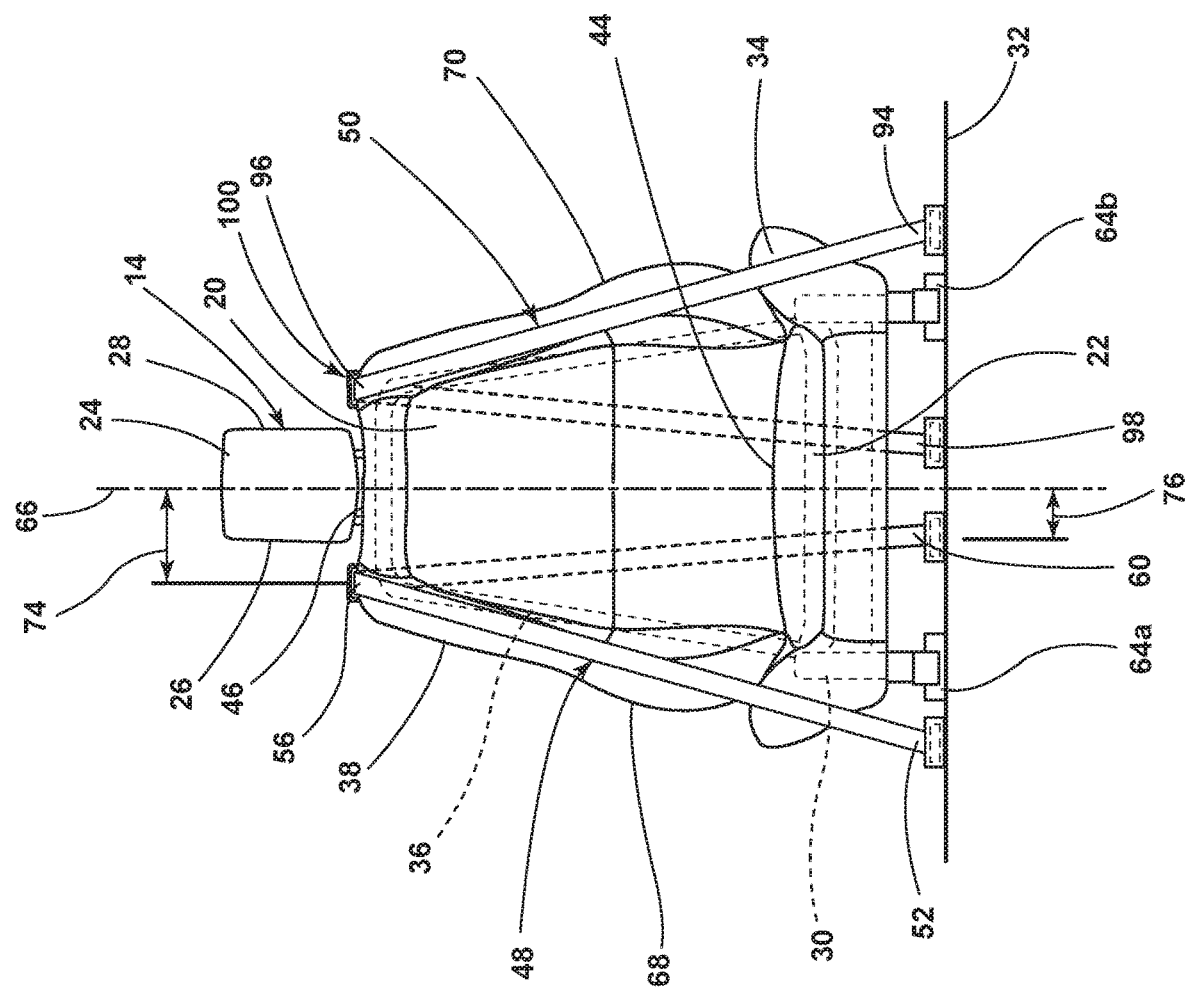
FIG. 5 is a front view of another embodiment of the seating assembly of FIG. 1, illustrating the distance laterally separating the first portion of the seatback support element disposed from the midline being greater than a distance between the third portion of the seatback support element and the midline.

Referring now additionally to FIGS. 4-5, the vehicle 10 can further include tracks 64a, 64b attached to the floor portion 32. The seating assembly 14 can selectively move forward or rearward upon the tracks 64a, 64b. In some embodiments, either the first portion 52 or the third portion 60, or both the first portion 52 and the third portion 60 of the seatback support element 48 are coupled to the track 64a. For example, in the embodiment illustrated in FIG. 3, both the first portion 52 and the third portion 60 are coupled to the track 64a. However, in the embodiment illustrated in FIG. 4, the third portion 60 but not the first portion 52 is coupled to the track 64a. In still another embodiment illustrated in FIG. 5, neither the first portion 52 nor the third portion 60 are coupled to the track 64a.

The seatback 20 has a vertical midline 66, conceptually dividing the seatback 20 into a first side 68 and a second side 70, which are at least approximately symmetrical. In the illustrated embodiments, the first portion 52 of the seatback support element 48 is coupled to the vehicle 10 at a position laterally further away from the vertical midline 66 of the seatback 20 than the second portion 56. In other words, a distance 72 (see FIG. 4) between the first portion 52 of the seatback support element 48 and the plane (not illustrated) through the vertical midline 66 dividing the seatback 20 into the first side 68 and the second side 70 is greater than a distance 74 between the second portion 56 of the seatback support element 48 and said plane. Extending the first portion 52 further away from the vertical midline 66 than the second portion 56 (e.g., where the seatback support element 48 interacts with the seatback 20) allows the seatback support element 48 to not interfere with the occupant (not illustrated) of the seating assembly 14 and to avoid touching the seat 22.

In some embodiments (such as the embodiment illustrated in FIG. 5), the third portion 60 of the seatback support element 48 is coupled to the vehicle 10 laterally closer to the vertical midline 66 of the seatback 20 than the second portion 56. In other words, a distance 76 between the third portion 60 of the seatback support element 48 and said plane through the vertical midline 66 is less than the distance 74 between the second portion 56 of the seatback support element 48 and said plane. In some embodiments, such as those illustrated in FIGS. 4 and 5, the first portion 52 is disposed laterally further away from the vertical midline 66 than the third portion 60.

Figure 6:
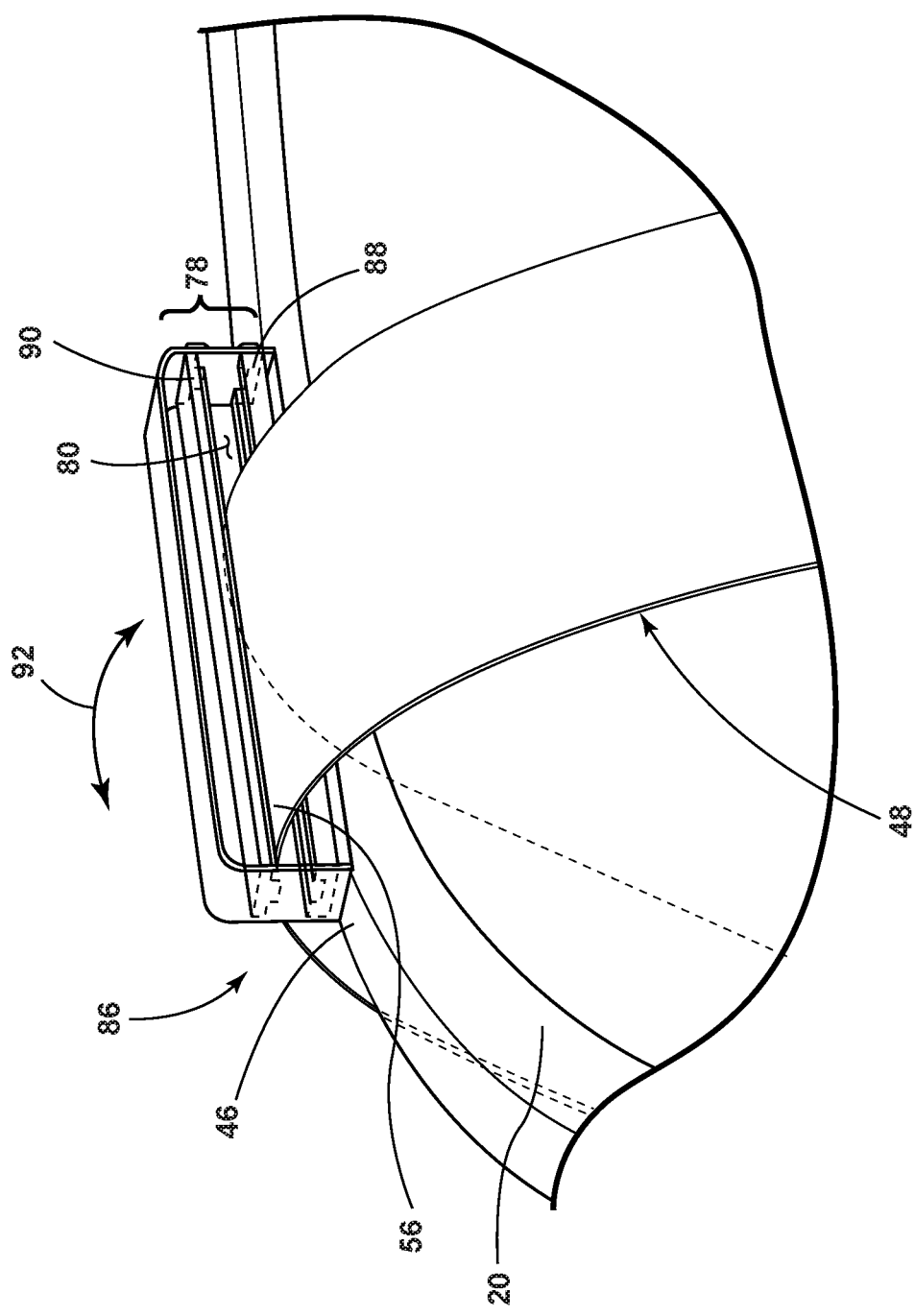
FIG. 6 is a magnified perspective view of area VI of FIG. 3, illustrating the seatback support element extending through an opening within the releasable locking mechanism, and illustrating the releasable locking mechanism in an unlocked position with a first member separated from a second member with the seatback support element disposed between the first member and the second member.
Figure 7:
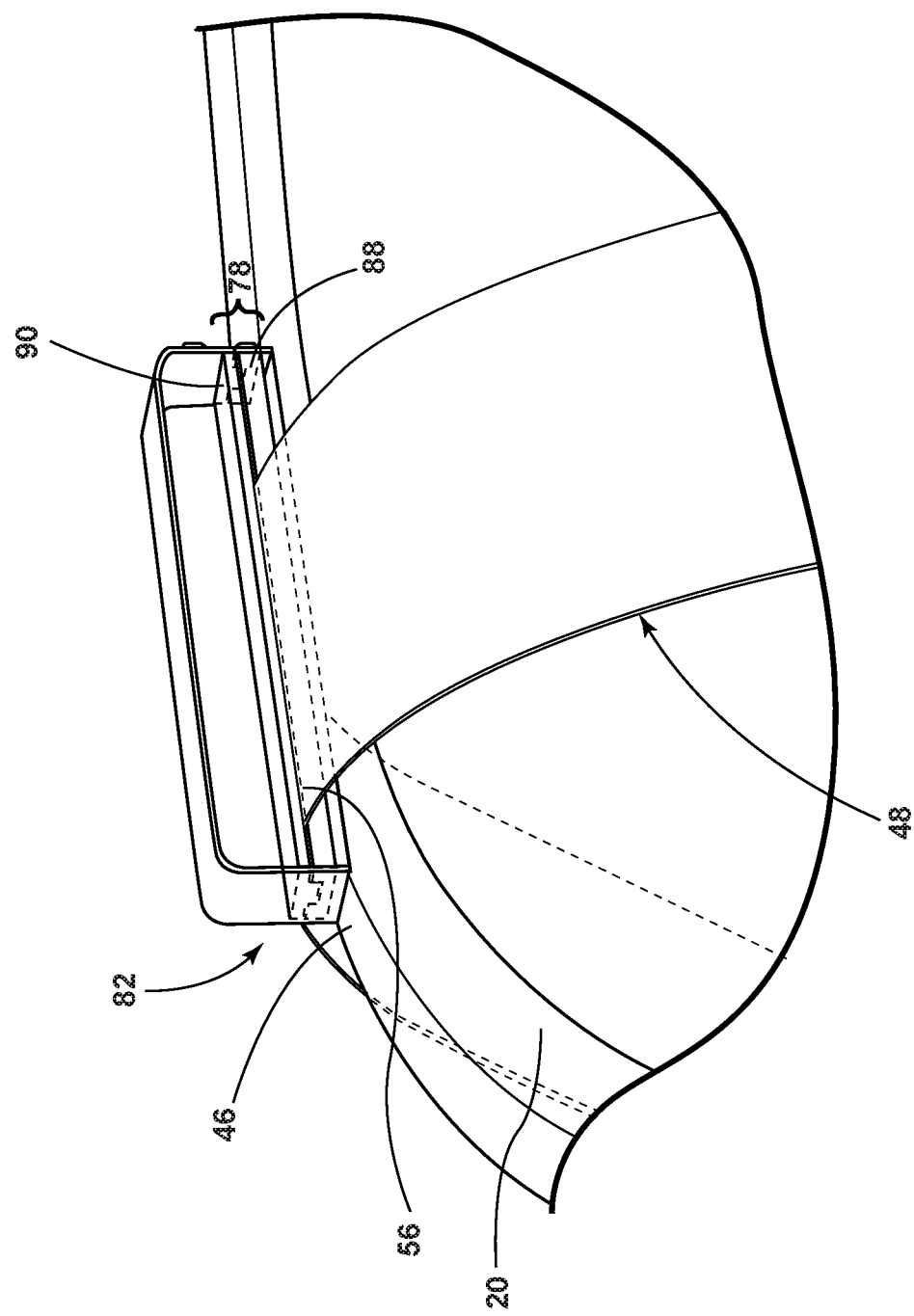
FIG. 7 is the same magnified perspective view of area VI of FIG. 3, but illustrating the releasable locking mechanism taking a locked position, where the seatback support element is trapped between the first member and the second member, thus precluding the seatback from pivoting due to tension in the seatback support element.

Referring now additionally to FIGS. 6 and 7, the seating assembly 14 further includes a releasable locking mechanism 78 disposed at the seatback 20, such as at the top portion 46 of the seatback 20. The releasable locking mechanism 78 can laterally retain the second portion 56 of the seatback support element 48 above the top portion 46 of the seatback 20, to prevent the seatback support element 48 from falling to the floor portion 32, with the seatback support element 48 extending through an opening 80 through the releasable locking mechanism 78.

Figure 8:
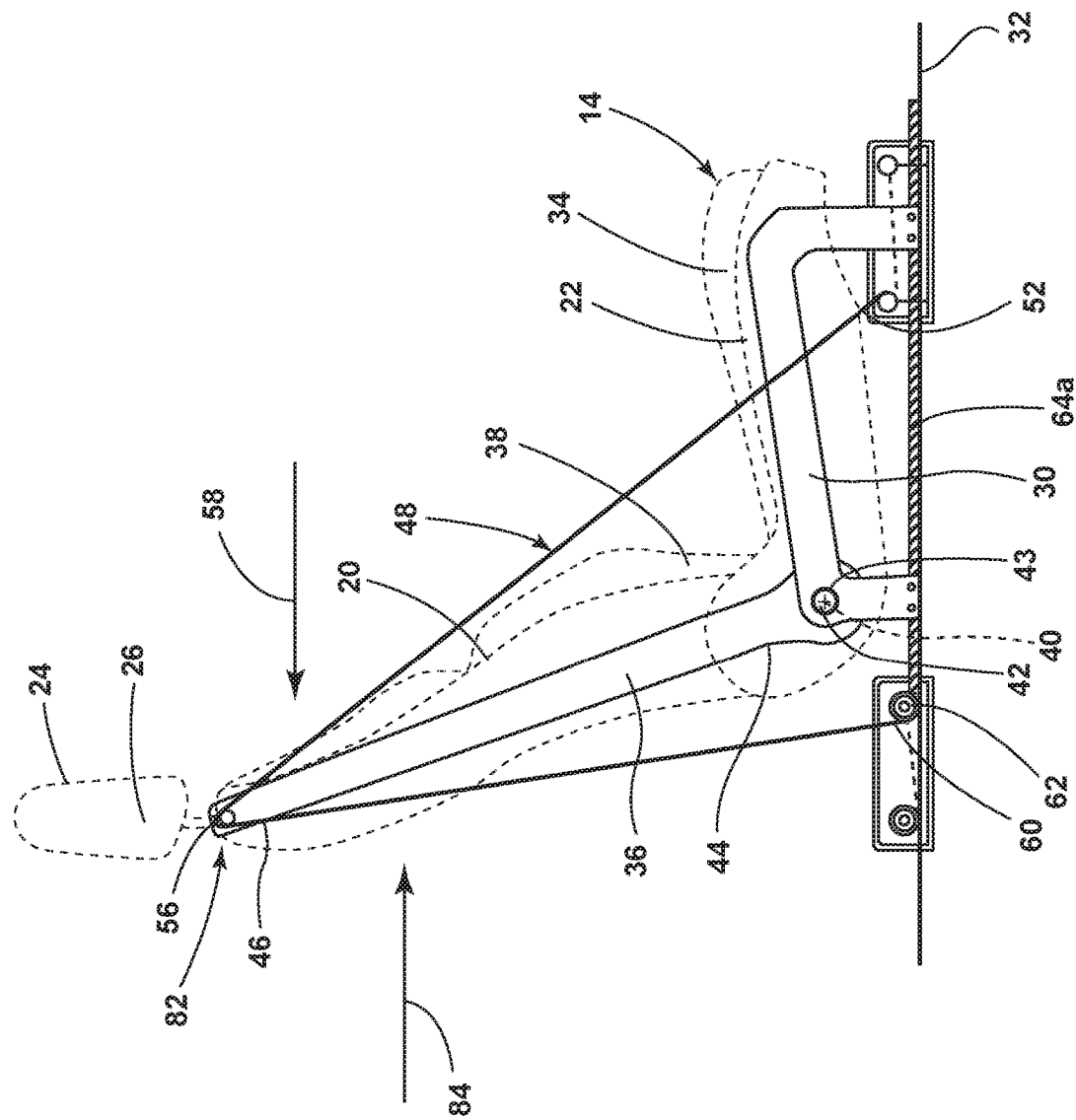
FIG. 8 is a side view of the seating assembly of FIG. 1, illustrating the releasable locking mechanism in the locked position and the seatback support element preventing a rearward force upon the seatback from pivoting the seatback in the rearward direction about an axis and preventing a forward force upon the seatback from pivoting the seatback in the forward direction about the axis.

The releasable locking mechanism 78 has a locked position 82 (see FIG. 7) relative to the seatback support element 48 such that the releasable locking mechanism 78 is locked onto the seatback support element 48. Because the seatback support element 48 interacts with the seatback 20 at the second portion 56 of the seatback support element 48, when the releasable locking mechanism 78 takes the locked position 82, the releasable locking mechanism 78 locks onto the seatback support element 48 at the second portion 56 of the seatback support element 48. The locking of the releasable locking mechanism 78 and thus the seatback 20 onto the seatback support element 48, when the releasable locking mechanism 78 is in the locked position 82, causes the seatback support element 48 to resist the seatback 20 pivoting about the axis 40. For example, when the rearward force 58 (see FIG. 8) is applied to the seatback 20, such as during a rear impact incident when an occupant (not illustrated) is occupying the seating assembly 14, the seatback support element 48 (particularly the seatback support element 48 between the first portion 52 and the second portion 56) resists the seatback 20 pivoting about the axis 40 in the rearward direction. In other words, the seatback support element 48 between the first portion 52 and the second portion 56 will experience tension, while the second seatback support element 50 between the second portion 56 and the third portion 60 may become slack. Similarly, when a forward force 84 (see again FIG. 8) is applied to the seatback 20, such as during a frontal impact incident when the occupant is occupying the seating assembly 14, during breaking, or when a forward moving article such as luggage impacts the seatback 20, the seatback support element 48 (particularly the seatback support element 48 between the second portion 56 and the third portion 60) resists the seatback 20 pivoting about the axis 40 in the forward direction. In other words, the seatback support element 48 between the second portion 56 and the third portion 60 will experience tension, while the seatback support element 48 between the first portion 52 and the second portion 56 may become slack.

In the locked position 82, the seatback support element 48 transforms the seatback 20 from essentially a cantilever extending from the axis 40 into a fixed beam, with support at both the top portion 46 and the bottom portion 44 of the seatback 20. Consequently, the seatback support element 48 eliminates any need for the complex and expensive recline lock mechanism typically utilized to resist pivotal movement of the seatback 20 about the axis 40. Everything else being equal, the further the first portion 52 and the third portion 60 are from the axis 40, the more able the seatback support element 48 is to resisting pivoting movement of the seatback 20 about the axis 40 with the releasable locking mechanism 78 in the locked position 82. However, in some embodiments, the first portion 52 or the third portion 60 can be anchored to the frame 30 of the seat 22 and thus relatively close to the axis 40.

Figure 9:
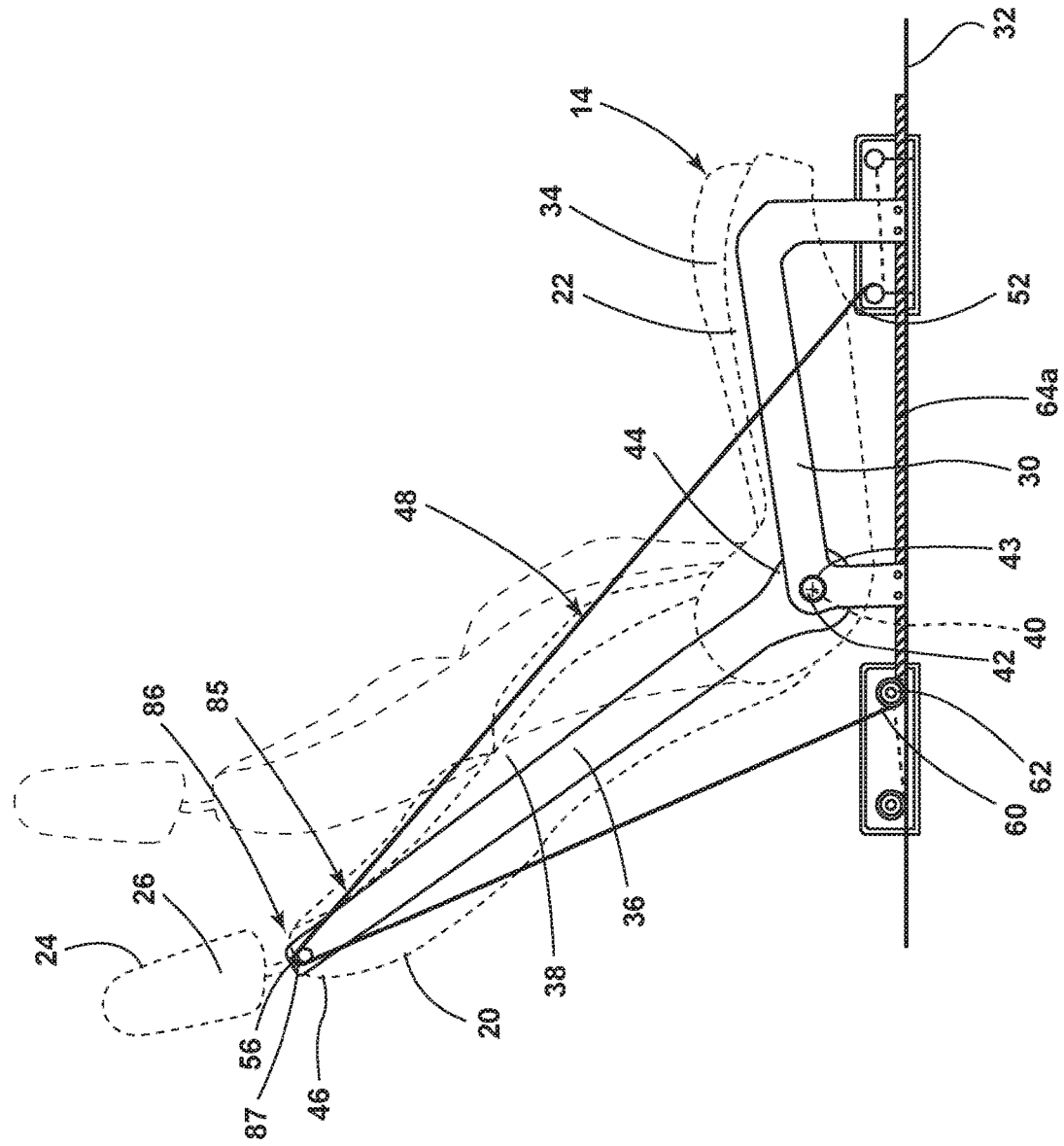
FIG. 9 is a side view of the seating assembly of FIG. 1, illustrating the releasable locking mechanism in the unlocked position and the seatback support element does not prevent the rearward force upon the seatback from pivoting the seatback in the rearward direction about the axis, for example, to allow an occupant to recline the seatback.

In addition to being able to take the locked position 82, the releasable locking mechanism 78 can take an unlocked position 86 relative to the seatback support element 48 where the releasable locking mechanism 78 is released from the seatback support element 48 and not latched or locked thereto. The seatback 20 can thus pivot about the axis 40, as illustrated in FIG. 9. As the seatback 20 pivots about the axis 40, the second portion 56 of the seatback support element 48, i.e., where the seatback 20 interacts with the seatback support element 48, can change to a different location on the seatback support element 48 between the first portion 52 and the third portion 60. For example, as the seatback 20 pivots about the axis 40, the second portion 56 of the seatback support element 48 might change from a point A 85 along the seatback support element 48 to a point B 87. The releasable locking mechanism 78 can then take the locked position 82 onto the seatback support element 48 at the point B 87, and the seatback support element 48 thereafter resists the seatback 20 further pivoting about the axis 40 in either the forward direction or the rearward direction. Consequently, the seatback support element 48 provides at least two functions: one function of the seatback support element 48 is to resist pivotal movement of the seatback 20 when the releasable locking mechanism 78 is in the locked position 82; a second function is to control the recline angle of the seatback 20 due to the ability of the seatback support element 48 to allow pivotal movement of the seatback 20 when the releasable locking mechanism 78 is in the unlocked position 86.

The releasable locking mechanism 78 can include a first member 88 and a second member 90, with the opening 80 through which the seatback support element 48 extends between the first member 88 and the second member 90. For the releasable locking mechanism 78 to be in the unlocked position 86, the second member 90 can be positioned relative to the first member 88 so as to permit movement of the seatback 20 and the releasable locking mechanism 78 relative to the seatback support element 48. For example, the first member 88 can be disposed under the seatback support element 48 and the second member 90 can be disposed over the seatback support element 48. In the unlocked position 86, the first member 88 can be positioned sufficiently away from the second member 90 so as to allow the seatback 20 (and the first member 88 of the releasable locking mechanism 78) to move 92 under the seatback support element 48, while the seatback support element 48 remains static or moves only due to retraction/unretraction of the seatback support element 48 into or out of the roller 62. However, for the releasable locking mechanism 78 to be in the locked position 82, the second member 90 can be moved sufficiently close to the first member 88 to crimp, latch, trap, or otherwise lock the seatback support element 48 between the first member 88 and the second member 90 so as to prevent movement of the seatback 20 relative to the seatback support element 48.

As mentioned above, the vehicle 10 can further include the second seatback support element 50 also interacting with the seatback 20 of the seating assembly 14. Like the seatback support element 48, the second seatback support element 50 includes a first portion 94 coupled to the vehicle 10 at a position other than the seatback 20, a second portion 96 where the seatback 20 interacts with the second seatback support element 50, and a third portion 98 coupled to the vehicle 10 at a position other than the seatback 20. As with the seatback support element 48, the second seatback support element 50 can resist pivoting of the seatback 20 about the axis 40. The second portion 96 is positioned between the first portion 94 and the third portion 98 along the length of the second seatback support element 50. The first portion 94 is coupled to the vehicle 10 at a position forward of the axis 40 of the seatback 20 and is thus the forward portion, and the third portion 98 is coupled to the vehicle 10 at a position rearward of the axis 40 and is thus the rearward portion.

The seatback support element 48 and the second seatback support element 50 cooperate to prevent twisting of the seatback 20 when the forward force 84 or the rearward force 58 is applied to the seatback 20. Accordingly, the second portion 56 of the seatback support element 48 interacts with the seatback 20 at the first side 68 of the vertical midline 66, while the second portion 96 of the second seatback support element 50 interacts with the seatback 20 at the second side 70 of the vertical midline 66. As in the illustrated embodiments, the second portion 56 of the seatback support element 48 can be disposed adjacent the first side 26 of the head restraint 24, while the second portion 96 of the second seatback support element 50 can be disposed adjacent the second side 28 of the head restraint 24. In the illustrated embodiment, the releasable locking mechanism 78 is disposed at the top portion 46 of the seatback 20 to the first side 68 of the vertical midline 66, with the seatback support element 48 extending through the opening 80 of the releasable locking mechanism 78. The seatback 20 further includes a second releasable locking mechanism 100 disposed at the top portion 46 to the second side 70 of the vertical midline 66. The second releasable locking mechanism 100 is identical to the releasable locking mechanism 78, and the second seatback support element 50 extends through an opening (not illustrated) of the second releasable locking mechanism 100 in the same manner as the seatback support element 48 extends through the opening 80 of the releasable locking mechanism 78. The second releasable locking mechanism 100, like the releasable locking mechanism 78, has a locked position where the second releasable locking mechanism 100 locks onto the second seatback support element 50, and the unlocked position 86 where the second releasable locking mechanism 100 does not lock onto the second seatback support element 50. Assuming that the releasable locking mechanism 78 is likewise in the unlocked position 86, the second releasable locking mechanism 100, when in the unlocked position 86, allows the seatback 20 to pivot about the axis 40 (for example, to change the recline position of the seatback 20). However, when both the releasable locking mechanism 78 and the second releasable locking mechanism 100 are in the locked position 82 respectively, and the rearward force 58 is applied to the seatback 20, the seatback support element 48 and the second seatback support element 50 resist reward pivotal movement of the seatback 20 about the axis 40. Likewise, when the releasable locking mechanism 78 and the second releasable locking mechanism 100 are in the locked position 82, and the forward force 84 is applied to the seatback 20, the seatback support element 48 and the second seatback support element 50 resist forward pivotal movement of the seatback 20 about the axis 40. In the illustrated embodiments, the first portion 52 (i.e., the forward portion) and the third portion 60 (i.e., the rearward portion) of the seatback support element 48, as well as the releasable locking mechanism 78, are all disposed laterally to the first side 68 of the vertical midline 66 of the seatback 20. In contrast, in the illustrated embodiments, the first portion 94 (i.e., the forward portion) and the third portion 98 (i.e., the reward portion) of the second seatback support element 50, as well as the second releasable locking mechanism 100, are all disposed laterally to the second side 70 of the vertical midline 66 of the seatback 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle comprising:
 a seating assembly including a seatback pivotally movable relative to a seat about an axis, the seatback including a bottom portion and a top portion disposed further away from the axis than the bottom portion;
 a floor portion supporting the seating assembly; and
 a seatback support element resisting pivotal movement of the seatback about the axis, the seatback support element comprising:

a first portion coupled to the vehicle at a position other than the seatback;
a second portion where the seatback interacts with the seatback support element; and
a third portion coupled to the vehicle at a position other than the seatback;
wherein, the second portion is between the first portion and the third portion along a length of the seatback support element;
wherein, at least one of the first portion or the third portion is coupled to the vehicle via a roller that applies pre-tension to the seatback support element; and
wherein, the first portion is coupled to the vehicle at a position forward of the axis of the seatback and the third portion is coupled to the vehicle at a position rearward of the axis of the seatback.

2. The vehicle of claim 1,
the first portion of the seatback support element is coupled to the floor portion.

3. The vehicle of claim 1 further comprising:
a track upon which the seating assembly selectively moves forward or rearward; and
either the first portion, the third portion, or both the first portion and the third portion are coupled to the track.

4. The vehicle of claim 3,
the seatback further comprising a vertical midline;
wherein, the third portion of the seatback support element is coupled to the track; and
wherein, the first portion of the seatback support element is disposed further away from the vertical midline than the third portion.

5. The vehicle of claim 1,
the seatback has a vertical midline; and
the first portion is coupled to the vehicle at a position laterally further away from the vertical midline of the seatback than the third portion.

6. The vehicle of claim 1,
wherein, the seatback has a locked position relative to the seatback support element such that the seatback is locked onto the seatback support element at the second portion of the seatback support element, and an unlocked position relative to the seatback support element such that the seatback can pivot about the axis and the second portion where the seatback interacts with the seatback support element changes to a different location on the seatback support element between the first portion and the third portion.

7. The vehicle of claim 1,
wherein, the third portion but not the first portion is coupled to the vehicle via a roller that applies pre-tension to the seatback support element, while the first portion is anchored to the vehicle.

8. The vehicle of claim 1,
the seatback has a vertical midline; and
the first portion is coupled to the vehicle at a position laterally further away from the vertical midline of the seatback than the second portion.

9. The vehicle of claim 8,
the third portion is coupled to the vehicle at a position laterally closer to the vertical midline of the seatback than the second portion.

10. The vehicle of claim 1,
wherein, when a rearward force is applied to the seatback, the seatback support element between the first portion and the second portion resists the seatback pivoting about the axis in a rearward direction.

11. The vehicle of claim 10,
wherein, when a forward force is applied to the seatback, the seatback support element between the third portion and the second portion resists the seatback pivoting about the axis in a forward direction.

12. The vehicle of claim 1,
wherein, the seatback is pivotally coupled to the seat about the axis.

13. The vehicle of claim 1,
wherein, the seatback is decoupled from the seat.

14. The vehicle of claim 1,
the seatback further comprising a vertical midline dividing the seatback into a first side and a second side;
the vehicle further comprising:
a second seatback support element having a first portion coupled to the vehicle at a position other than the seatback, a second portion where the seatback interacts with the second seatback support element, and a third portion coupled to the vehicle at a position other than the seatback, the second seatback support element resisting pivoting of the seatback about the axis;
wherein, the second portion of the second seatback support element is positioned between the first portion and the third portion along the second seatback support element, and the first portion of the second seatback support element is coupled to the vehicle at a position forward of the axis of the seatback and the third portion of the second seatback support element is coupled to the vehicle at a position rearward of the axis of the seatback; and
wherein, the second portion of the seatback support element interacts with the seatback at the first side of the vertical midline and the second portion of the second seatback support element interacts with the seatback at the second side of the vertical midline.

15. The vehicle of claim 14,
the seating assembly further comprising a head restraint extending from the seatback, the head restraint having a first side and a second side;
wherein, the second portion of the seatback support element is disposed adjacent the first side of the head restraint, and the second portion of the second seatback support element is disposed adjacent the second side of the head restraint.

16. A vehicle comprising:
a seating assembly including a seatback pivotally movable relative to a seat about an axis, the seatback including a bottom portion, a top portion disposed further away from the axis than the bottom portion, and a releasable locking mechanism at the top portion;
a seatback support element that extends through an opening of the releasable locking mechanism of the seating assembly, the seatback support element having a forward portion coupled to the vehicle at a position forward of the axis of the seatback and a rearward portion coupled to the vehicle at a position rearward of the axis of the seatback; and
the seatback having a locked position where the releasable locking mechanism locks onto the seatback support element, and an unlocked position where the releasable locking mechanism does not lock onto the seatback support element and the seatback can pivot about the axis;
wherein, when the releasable locking mechanism is in the locked position, and a rearward force is applied to the seatback, the seatback support element resists the seatback pivoting about the axis in a rearward direction; and wherein, when the releasable locking mechanism is in the locked position, and a forward force is applied to the seatback, the seatback support element resists the seatback pivoting about the axis in a forward direction.

17. The vehicle of claim 16,
the seating assembly further including a track upon which the seating assembly selectively moves forward or rearward; and
the rearward portion is coupled to the track.

18. The vehicle of claim 16,
wherein, the rearward portion is coupled to the vehicle via a roller that applies pre-tension to the seatback support element.

19. The vehicle of claim 16,
the seatback further comprising a vertical midline; and
the forward portion is coupled to the vehicle at a position laterally further away from the vertical midline of the seatback than where the seatback support element extends through the releasable locking mechanism.

20. A vehicle comprising:
a seating assembly including a seatback pivotally movable relative to a seat about an axis;
the seatback comprising:
  a bottom portion;
  a top portion disposed further away from the axis than the bottom portion;
  a vertical midline separating the seatback into a first side and a second side;
  a first releasable locking mechanism at the top portion to the first side of the vertical midline; and
  a second releasable locking mechanism at the top portion to the second side of the vertical midline;
a first seatback support element that extends through the first releasable locking mechanism of the seating assembly;
a second seatback support element that extends through the second releasable locking mechanism of the seating assembly;
the first seatback support element and the second seatback support element each having a forward portion coupled to the vehicle at a position forward of the seatback and a rearward portion coupled to the vehicle at a position rearward of the seatback; and
the seatback having a locked position where the first releasable locking mechanism locks onto the first seatback support element and the second releasable locking mechanism locks onto the second seatback support element, and an unlocked position where the first releasable locking mechanism does not lock onto the first seatback support element and the second releasable locking mechanism does not lock onto the second seatback support element, allowing the seatback to pivot about the axis;
wherein, when the first releasable locking mechanism and the second releasable locking mechanism are in the locked position, and a rearward force is applied to the seatback, the first seatback support element and the second seatback support element resist rearward pivotal movement of the seatback about the axis;
wherein, when the first releasable locking mechanism and the second releasable locking mechanism are in the locked position, and a forward force is applied to the seatback, the first seatback support element and the second seatback support element resist forward pivotal movement of the seatback about the axis;
wherein, the forward portion and the rearward portion of the first seatback support element, and the first releasable locking mechanism, are all disposed laterally to the first side of the vertical midline of the seatback; and
wherein, the forward portion and the rearward portion of the second seatback support element, and the second releasable locking mechanism, are all disposed laterally to the second side of the vertical midline of the seatback.

* * * * *